US011858326B2

(12) United States Patent
Newlin et al.

(10) Patent No.: US 11,858,326 B2
(45) Date of Patent: Jan. 2, 2024

(54) FAULT-TOLERANT FUEL ISOLATION FROM ENGINE FIREBAY

(71) Applicant: GENERAL ATOMICS AERONAUTICAL SYSTEMS, INC., San Diego, CA (US)

(72) Inventors: Jason B. Newlin, San Diego, CA (US); Brett C. Bonner, San Diego, CA (US); Graham Feasey, San Diego, CA (US)

(73) Assignee: GENERAL ATOMICS AERONAUTICAL SYSTEMS, INC., San Diego, CA (US)

(*) Notice: Subject to any disclaimer, the term of this patent is extended or adjusted under 35 U.S.C. 154(b) by 0 days.

(21) Appl. No.: 18/087,635

(22) Filed: Dec. 22, 2022

(65) Prior Publication Data
US 2023/0294511 A1 Sep. 21, 2023

Related U.S. Application Data

(63) Continuation of application No. 17/673,012, filed on Feb. 16, 2022, now Pat. No. 11,560,051, which is a
(Continued)

(51) Int. Cl.
*B60K 15/07* (2006.01)
*F02M 37/00* (2006.01)
(Continued)

(52) U.S. Cl.
CPC ....... *B60K 15/077* (2013.01); *F02M 37/0088* (2013.01); *F02M 37/106* (2013.01);
(Continued)

(58) Field of Classification Search
CPC ............... F02M 37/00; F02M 37/0052; F02M 37/0088; F02M 37/025; F02M 37/106;
(Continued)

(56) References Cited

U.S. PATENT DOCUMENTS 1,043,488 A 11/1912 Waugh
4,032,091 A 6/1977 Reddy
(Continued)

FOREIGN PATENT DOCUMENTS

EP 3305372 4/2018
WO 2021206884 10/2021

OTHER PUBLICATIONS

EASA; "Certification Specifications for Normal, Utility, Aerobatic, and Commuter Category Aeroplanes"; Section 279, Paragraph 23.1189; https://www.easa.europa.eu/sites/default/files/dfu/agency-measures-docs-certific ationspecifications-CS-23-CS-23-Amdt-3.pdf; Jul. 12, 2012; pp. 1-2.
(Continued)

*Primary Examiner* — John Kwon
*Assistant Examiner* — Johnny H Hoang
(74) *Attorney, Agent, or Firm* — Fitch, Even, Tabin & Flannery LLP

(57) ABSTRACT

Fuel isolation systems, apparatuses and methods are described. In some embodiments, a system comprises a fuel tank, a fuel pump, an engine, a firewall, a fuel line from the fuel tank to the engine, a connector coupled inline with the fuel line on a cold side of the fuel line, a valve coupled to the connector, a fluid feed line coupled to a fluid source and to the valve. In the event of an engine fire condition, a control unit outputs signaling to turn off the fuel pump and operate the valve to introduce fluid from the fluid source into the fuel line. The introduced fluid provides a siphon break in the fuel line such that the only fuel that can pass the firewall is the remaining fuel in the fuel line downstream of the connector and the introduced fluid.

40 Claims, 7 Drawing Sheets

Related U.S. Application Data continuation of application No. 16/842,574, filed on Apr. 7, 2020, now Pat. No. 11,279,225.

(51) Int. Cl.
  *F02M 37/10* (2006.01)
  *B60K 15/077* (2006.01)
  *B60K 15/03* (2006.01)
  *F02M 37/02* (2006.01)

(52) U.S. Cl.
  CPC .............. *B60K 2015/03138* (2013.01); *B60K 2015/03144* (2013.01); *B60K 2015/03217* (2013.01); *F02M 37/0052* (2013.01); *F02M 37/025* (2013.01)

(58) Field of Classification Search
  CPC .......... B60K 15/07; B60K 2015/03138; B60K 2015/03144; B60K 2015/03217; F02N 11/02; F02D 41/20; F02D 41/30; B64C 2201/042; B64D 27/24
  See application file for complete search history.

(56) References Cited

U.S. PATENT DOCUMENTS

| | | | |
|---|---|---|---|
| 4,719,750 | A | 1/1988 | Lemmin |
| 4,913,380 | A | 4/1990 | Vardaman |
| 6,668,802 | B2 | 12/2003 | Kiowsky |
| 7,520,136 | B2 | 4/2009 | Kervistin |
| 7,857,260 | B2 | 12/2010 | Morgia |
| 8,549,863 | B2 | 10/2013 | Brocard |
| 8,881,764 | B2 | 11/2014 | Smith |
| 9,799,151 | B2 | 10/2017 | Olson |
| 9,932,124 | B2 | 4/2018 | Kamath |
| 9,963,030 | B2 | 5/2018 | Kirk |
| 11,279,225 | B2 | 3/2022 | Newlin |
| 11,560,051 | B2 | 1/2023 | Newlin |
| 2005/0051376 | A1 | 3/2005 | Cook |
| 2014/0208943 | A1 | 7/2014 | Gupta |
| 2015/0217153 | A1 | 8/2015 | Jones |
| 2017/0306850 | A1 | 10/2017 | Stack |
| 2018/0179993 | A1 | 6/2018 | Dudar |
| 2019/0186437 | A1 | 6/2019 | Lowery |
| 2019/0186440 | A1 | 6/2019 | Perfetto |
| 2019/0353121 | A1 | 11/2019 | Mills |
| 2020/0189385 | A1 | 6/2020 | Dudar |
| 2020/0378345 | A1 | 12/2020 | Dudar |
| 2021/0309101 | A1 | 10/2021 | Newlin |
| 2022/0169111 | A1 | 6/2022 | Newlin |

OTHER PUBLICATIONS

ECFR; "Part 23—Airworthiness Standards: Normal Category Airplanes"; 14 CFR 23.2440(d)(1); https://www.ecfr.gov/cgi-bin/text-idx?node=pt14.1.23#se14.1.23_12440; Dec. 30, 2016; pp. 1-4.
PCT; App. No. PCT/US2021/022732; International Search Report and Written Opinion dated Jun. 3, 2021.
Pei; "Antisiphon Valve"; archived version published at https://web.archive.org/web/20160930054358/https://www.pei.org/wiki/antisiphon-valve; Sep. 30, 2016; pp. 1.
Stack Exchange; "How to Stop Water Flow in a Siphon?"; archived version published at https://web.archive.org/web/20161211183019/https://engineering.stackexchange.com/questions/8619/how-to-stop-water-flow-in-a-siphon; Dec. 11, 2016; pp. 1-4.
USPTO; U.S. Appl. No. 16/842,574; Notice of Allowance dated Nov. 17, 2021; (6 pages).
Wikipedia; "Aircraft Fuel System"; archived version published at https://web.archive.org/web/20190331193721/https://en.wikipedia.org/wiki/Aircraft_fuel_system; Mar. 31, 2019; pp. 1-3.
USPTO; U.S. Appl. No. 17/673,012; Office Action dated Jun. 10, 2022; (7 pages).
USPTO; U.S. Appl. No. 17/673,012; Notice of Allowance dated Sep. 21, 2022; (5 pages).

FAULT-TOLERANT FUEL ISOLATION FROM ENGINE FIREBAY

CROSS-REFERENCE TO RELATED APPLICATION(S)

This application is a continuation of U.S. application Ser. No. 17/673,012 filed Feb. 16, 2022, which is a continuation of U.S. application Ser. No. 16/842,574 filed Apr. 7, 2020, all of which are incorporated herein by reference in their entirety.

TECHNICAL FIELD

This invention relates generally to fuel delivery systems in aircraft, and more specifically to systems for isolating fuel from an aircraft firebay.

BACKGROUND

Numerous international codes and regulations cover various aspects of aircraft. For example, to be compliant with the European Aviation Safety Agency Certification Specification, (EASA) CS 23.1189, and the Unites Stated Code of Federation Regulations, 14 CFR 23.2440(d)(1), aircraft must include a means to shut-off or prevent hazardous quantities of flammable fluids from flowing into, within or through any engine compartment in the event of an engine fire. Accordingly, in the event of an engine fire, the flow of fuel to the engine must be able to be shut off. Traditional approaches involve the use of a normally open shut off valve in line with the fuel feed line on the cold side of the firewall, the engine being located in the firebay on the hot side of the firewall. In the event of an engine fire, the shut off valve is closed which cuts off the flow of fuel from the point of the valve to the engine. This solution is effective; however, introduces a single point of failure in the safety system. That is, due to electrical and/or mechanical issue/s, the normally open shut off valve may erroneously close when there is not an engine fire or other event. In this event, the engine will not receive further fuel and propulsion is lost. Such an event can be catastrophic in single engine aircraft.

BRIEF DESCRIPTION OF THE DRAWINGS

Disclosed Herein are Embodiments of Systems, Apparatuses and Methods for Isolating Fuel from an Engine Firebay. This Description Includes Drawings, Wherein.

Figure 1:
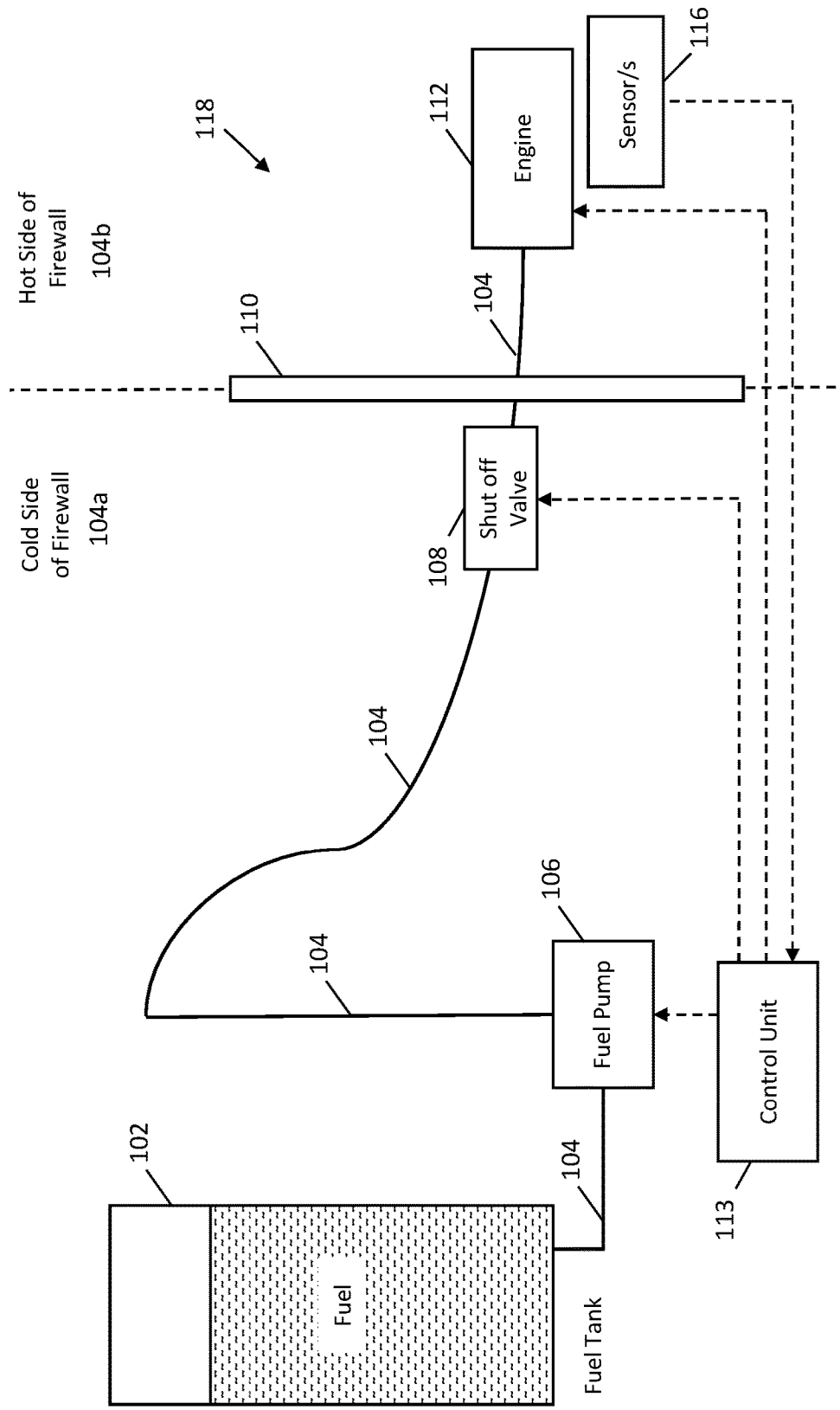
FIG. 1 comprises a simplified diagram of a conventional system for isolating fuel from the firebay of an aircraft.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein for isolating fuel from an engine firebay. Several embodiments described herein provide a solution that will isolate fuel from the firebay compliant with known regulations and that will also not introduce a single point of failure in the safety system.

Generally, according to some embodiments, fuel isolation to the engine firebay is provided through the use of a valve on the cold side of a firewall, the valve being coupled between an ullage of a fuel tank and an elevation of the fuel feed line at or above the ullage of the fuel tank. In the event of an engine fire condition, the airframe fuel pumps are turned off and the valve is opened to introduce air from the ullage portion into the fuel feed line as a vacuum break or siphon break such that the only fuel that will pass the firewall is the remaining fuel in the line downstream of the introduced air, and additional fuel cannot be siphoned. In some embodiments, to ensure adequate ullage and to reduce system pressure, a jettison valve is briefly opened and closed. In some embodiments, the valve replaces a conventional latching solenoid controlled shut valve at the firewall. In some embodiments, the valve does not introduce a single point of failure in the system such that propulsion system reliability is not sacrificed. For example, if the valve erroneously at least partially opens during normal operation due to a failure, a small amount of fuel may flow through the valve and back into the fuel tank, but fuel will continue to flow through the fuel feed line to the engine at a sufficient level for safe operation of the engine. In some embodiments, in the event a fire condition that results in operation of the valve but the event is actually not a fire event, the valve is closed and the airframe fuel pumps and engine are turned back on to resume normal operation. In some embodiments, the operation of the valve is initiated by the pilot or automatically by a control unit. In some embodiments, the aircraft is a manned aerial vehicle or an unmanned aerial vehicle. In some embodiments, the aircraft is a multi-engine or single engine aircraft. In alternative embodiments, the system and method are used in the same manner in other than aerial vehicles, such as watercraft (e.g., surface boat or submarine vehicles) and ground vehicles (e.g., automobiles, trucks).

In some embodiments, a system and method for use in isolating fuel from an aircraft firebay comprises: a fuel tank; an airframe fuel pump; an engine located within the aircraft firebay; a firewall separating the aircraft firebay from a volume containing the fuel tank and the airframe fuel pump; a fuel feed line extending from the fuel tank to the airframe fuel pump and through the firewall to the engine, the fuel feed line fluidly connecting the fuel tank to the engine and additional aircraft systems, wherein the airframe fuel pump is configured to pump fuel from the fuel tank through the fuel feed line to the engine, wherein the fuel feed line comprises a cold side portion extending from the fuel tank to the firewall and a hot side portion extending from the firewall to the engine; a connector coupled inline with the fuel feed line at a location of the cold side portion of the fuel feed line; a valve coupled to the connector, the valve configured in a normally closed orientation; an air feed line coupled to an ullage portion of the fuel tank and to the valve; and a control unit configured to control operation of at least the airframe fuel pump and the valve. In the event of an engine fire, the control unit is configured to output control signaling to: turn off the airframe fuel pump to stop pumping the fuel through the fuel feed line; and open the valve to introduce air from the ullage portion of the fuel tank into the fuel feed line, wherein the air introduced by the valve provides a siphon break in the fuel line such that the fuel cannot be siphoned and the only fuel that can pass the firewall is the remaining fuel in the fuel feed line downstream of the connector and the introduced air.

Referring now to FIG. 1, a simplified diagram is shown of a conventional system for isolating fuel from the firebay of an aircraft. Shown is a fuel system including a fuel tank 102, a fuel feed line 104, airframe fuel pump/s 106 (also referred to as fuel pump 106), a shut off valve 108, a firewall 110, an engine 112, a control unit 113 and sensors 116. Fuel is stored in the fuel tank 102 under pressure. Fuel is pumped from the fuel tank 102 by the fuel pump 106 via the fuel feed line 104 through the open shut off valve 108 through the firewall 110 and to the engine 112. It is understood that many system components are not illustrated. The control unit 113 is electrically coupled to and outputs various control signals to the fuel pump 106, the shut off valve 108 and the engine 112. The sensors 116 are located proximate to the engine 112 and are used to sense or detect conditions indicating an engine fire. The sensors 116 output signals to the control unit 114. The portion of the fuel feed line 104 upstream of the firewall (between the fuel tank 102 and the firewall 110) can be referred to as the cold side portion 104a of the fuel feed line 104, and the portion of the fuel feed line 104 downstream of the firewall (between the firewall 110 and the engine 112) can be referred to as the hot side portion 104b of the fuel feed line 104. The volume on the hot side portion 104b containing the engine 112 is the firebay 118.

In operation, under control of the control unit 113, fuel is pumped from the fuel tank 102 via the fuel feed line 104 through the firewall 110 to the engine 112 by the fuel pump 106. It is understood that there are additional components that are not shown at the fuel pump 106 including fuel filters and heat exchangers and fuel can be sent to other fuel bays, e.g., by a jet pump manifold. In this diagram, when the sensors 116 detect significant heat or other condition indicative of an engine fire, the sensors 116 output a signal to the control unit 113. On pilot command, the control unit 113 attempts to shut down the engine 112, turns off the fuel pumps 106 and causes the shut off valve 108 to close. This stops the flow of fuel to the engine 112 and meets many of the various aviation codes. The shut off valve 108 is a solenoid activated latching valve that when closed does not require further power to remain closed, and will remain closed for the remaining duration of flight. However, such systems leads to a single point of failure. That is, it is possible that the shut off valve 108 may erroneously close or partially close due to a mechanical and/or electrical failure. In that case, despite the fact that there is not an engine fire and the fuel pump 106 is in normal operation, no fuel will reach the engine and propulsion will be lost. Additionally, should the sensors 116 indicate an engine fire and shutdown is initiated, but the event is not actually an engine fire, the shut off valve 108 cannot be re-opened during flight. In either case, propulsion is lost. Such situations can be catastrophic in single engine aircraft.

Figure 2:
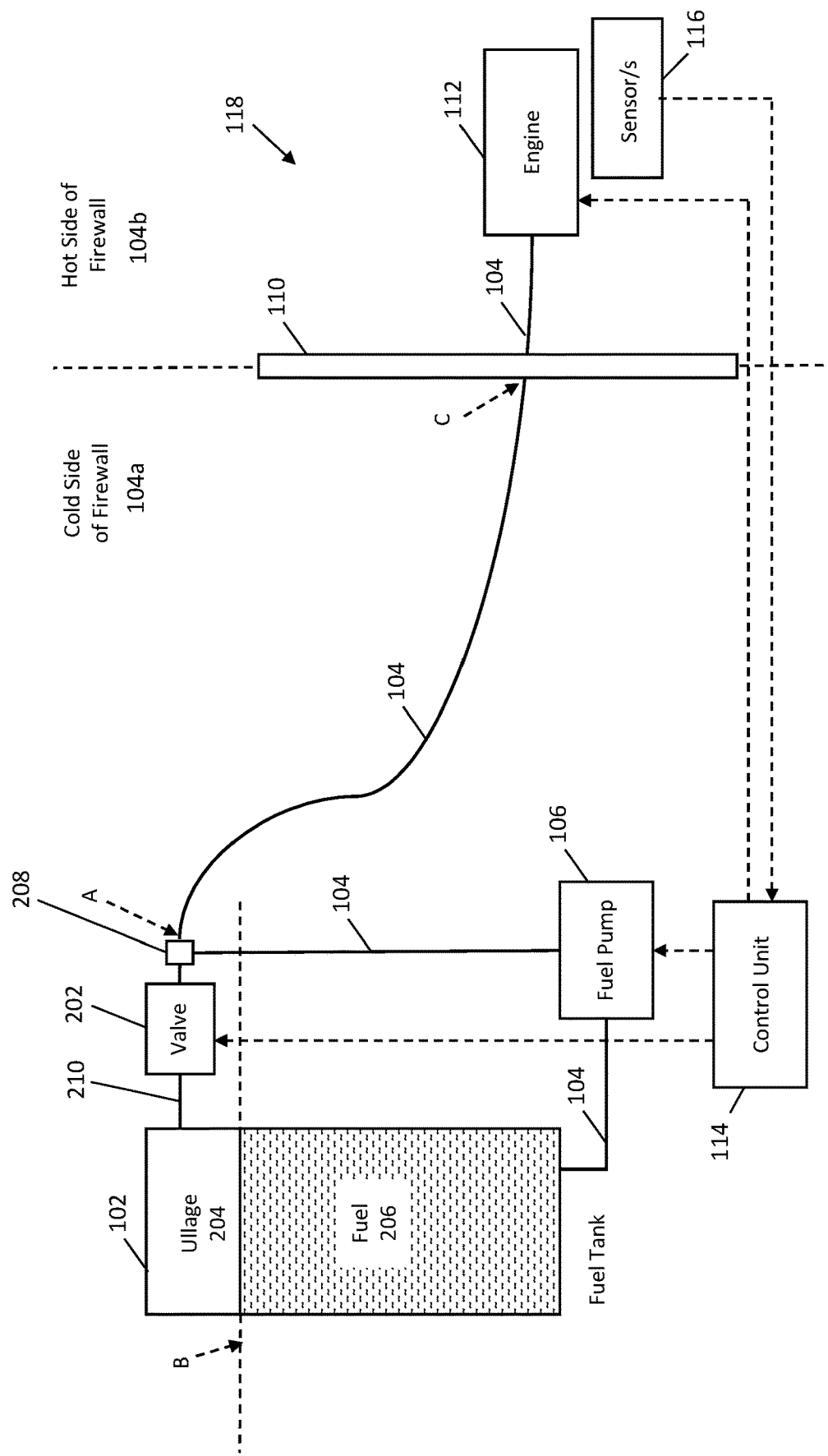
FIG. 2 comprises a simplified diagram of a system for isolating fuel from the firebay of an aircraft according to some embodiments.

Referring now to FIG. 2, a simplified diagram is shown of a system for isolating fuel from the firebay of an aircraft according to some embodiments. In addition to the components already identified in FIG. 1, shown are a valve 202, a connector 208, and an ullage portion 204 and a fuel portion 206 of the fuel tank 102, and an air line 210. In some embodiments, instead of including a shut off valve 108 in the fuel feed line at or upstream of the firewall 110, the valve 202 is fluidly connected between the ullage portion 204 of the fuel tank 102 and the fuel feed line 104 at the connector 208. That is, the air line 210 is connected from the ullage portion 204 to the fuel feed line 104 by the valve 202 and the connector 208. The connector 208 is coupled to the fuel feed line 104 at an elevation point of the fuel feed line that is at or above a level corresponding to a low level of the ullage portion 204 of the fuel tank 102. In the illustrated embodiment of FIG. 2, the connector 208 is at the high elevation point A of the fuel feed line 104. In the illustrated embodiment, the low elevation point of the ullage portion 204 is illustrated at line B. Thus, in some embodiments, the connector 208 is coupled to the fuel feed line 104 at an elevation at or above line B. In some embodiments, the connector 208 is a tee connector coupled inline with fuel feed line 104 and is connected to the valve 202. In some embodiments, the valve 202 is a non-latching, solenoid activated valve in a normally closed orientation that is electrically operated. In order to open the valve 202, a control signal (e.g., a 28 volt signal) is output by the control unit 114 which causes the valve to open for the duration of the application of the control signal. In some embodiments, the contents of the fuel tank 102 are maintained under pressure. That is, the ullage portion 204 includes air under pressure. In other embodiments, the air in the ullage portion is not under pressure, e.g., when the fuel tank is low and/or when the jettison system is activated. It is noted that the control unit 114 is similar to the control unit 113 but includes programming and functionality to implement fuel isolation methods in accordance with several embodiments.

When the sensors 116 output signals indicating an engine fire and the fuel isolation protocol is initiated (either automatically by the control unit 114 or after signal from the pilot), the control unit 114 outputs signaling to attempt to turn off the engine, to remove power to the fuel pumps 106 and to open the valve 202. When the valve 202 opens, air from the ullage portion 204 is introduced into the fuel feed line 104 at the connector 208, e.g., an air bubble is introduced into the fuel feed line 104. The introduced air provides a vacuum break or siphon break in the fuel feed line 104 at point A that will prevent siphon action in the fuel feed line 104. In this situation, fuel is not pumped through the fuel feed line 104 by the fuel pumps 106 and due to the introduction of the air, the engine 112 (or ruptured lines in the firebay 118) may not siphon fuel through the fuel feed line 104 to the engine 112. And thus, the only fuel that can pass the firewall 110 is the remaining fuel in the fuel feed line 104 downstream of the introduced air, i.e., any fuel already in the fuel feed line 104 between points A and C. The distance between A and C is designed such that the volume of fuel that can pass the firewall 110 is minimal and, in any event, less than the amount allowed by various international codes and regulations. In some embodiments, the volume of fuel between points A and C is less than one liter; thus meeting aviation codes and regulations that indicate a hazardous amount of fuel cannot enter the enter, and defining a hazardous amount as 1 liter. In some embodiments, the valve 202 is referred to as an anti-siphon valve since in this configuration and use, it functions to break siphon action in the fuel feed line 104 to prevent fuel from being siphoned through the fuel feed line 104; however, the valve 202 itself is not a traditional anti-siphon valve used to prevent fluid flow from reversing as is understood in the art. In some embodiments, the valve is a simple, non-latching, solenoid activated valve in a normally closed orientation. It is understood that the valve 202 and connector 208 may be integrated into one device or may be separate devices coupled or connected together. The air line 210 connects to the ullage portion 204 to provide the source of air for introduction into the fuel feed line 104. It is understood that the valve 202 is connected to the ullage portion 204 by a conduit, hose or piping line and connector at the fuel tank (not shown).

In some embodiments, a jettison valve (not shown in FIG. 2, see also FIG. 4) is briefly opened at the same time or shortly after the valve 202 is opened. Normally, as is well known, the jettison valve is used to dump large volumes of fuel from the fuel tank/s. In this use, the jettison valve is opened for a short period of time (e.g., 15 seconds) in order to ensure that there is adequate ullage available and to reduce pressure in the fuel system.

In some embodiments, the control unit 114 also causes the propeller/s of the aircraft to be feathered in order to provide the lowest drag and give the aircraft the best glide performance given that there is an engine fire event and that the engine is being shut down. Further details of such embodiments are described in more detail in the discussion below corresponding to FIG. 4.

In some embodiments, in the illustrated configuration, the fuel isolation to the firebay 118 is reversible in the event it is determined that the event is not an actual engine fire. In such event, the control unit 114 outputs signals to turn on the fuel pump 106 and close the valve 202, unfeather the propeller/s, and then turn back on the engine 112. In this case, the flow of fuel will resume to the engine. The engine will experience a brief loss of power as it ingests the air introduced into the fuel feed line 104 and then will resume normal operation.

In some embodiments, the fuel isolation system and method does not introduce a single point of failure in the system, as does a traditional shut off valve 108. If the valve 202 erroneously partially or fully opens due to an electrical and/or mechanical failure, a small portion of the flowing fuel may pass through the valve 202 and reenter the fuel tank 102, but the majority of the fuel will continue flowing through the fuel feed line 104 through the firewall 110 to the engine 112. In any event, a sufficient amount of fuel will continue to flow to the engine 112 to provide safe operation of the engine. In some embodiments, this is due to the size differential between the valve 202 and air line 210 connecting the valve 202 to the fuel tank 102, and the fuel feed line. For example, in some embodiments, the diameter of the air line 210 connecting the ullage portion 204 to the valve 202 is about 0.25 inches (0.0635 cm) whereas the diameter of the fuel feed line 104 is about 1.0 inches (2.54 cm). In other words, the ratio of the diameter of the air line 210 to the fuel feed line 104 is about 1:4. It is understood that this ratio may be different and depends on the dimensions, pressures, flow rates, volumes and other characteristics of the particular system. For example, the size ratio may be between 1:2, 1:3, 1:4, 1:5 and so on. As can be seen in this embodiment, should the valve 202 open due to a failure, safe operation of the aircraft continues.

Figure 3:
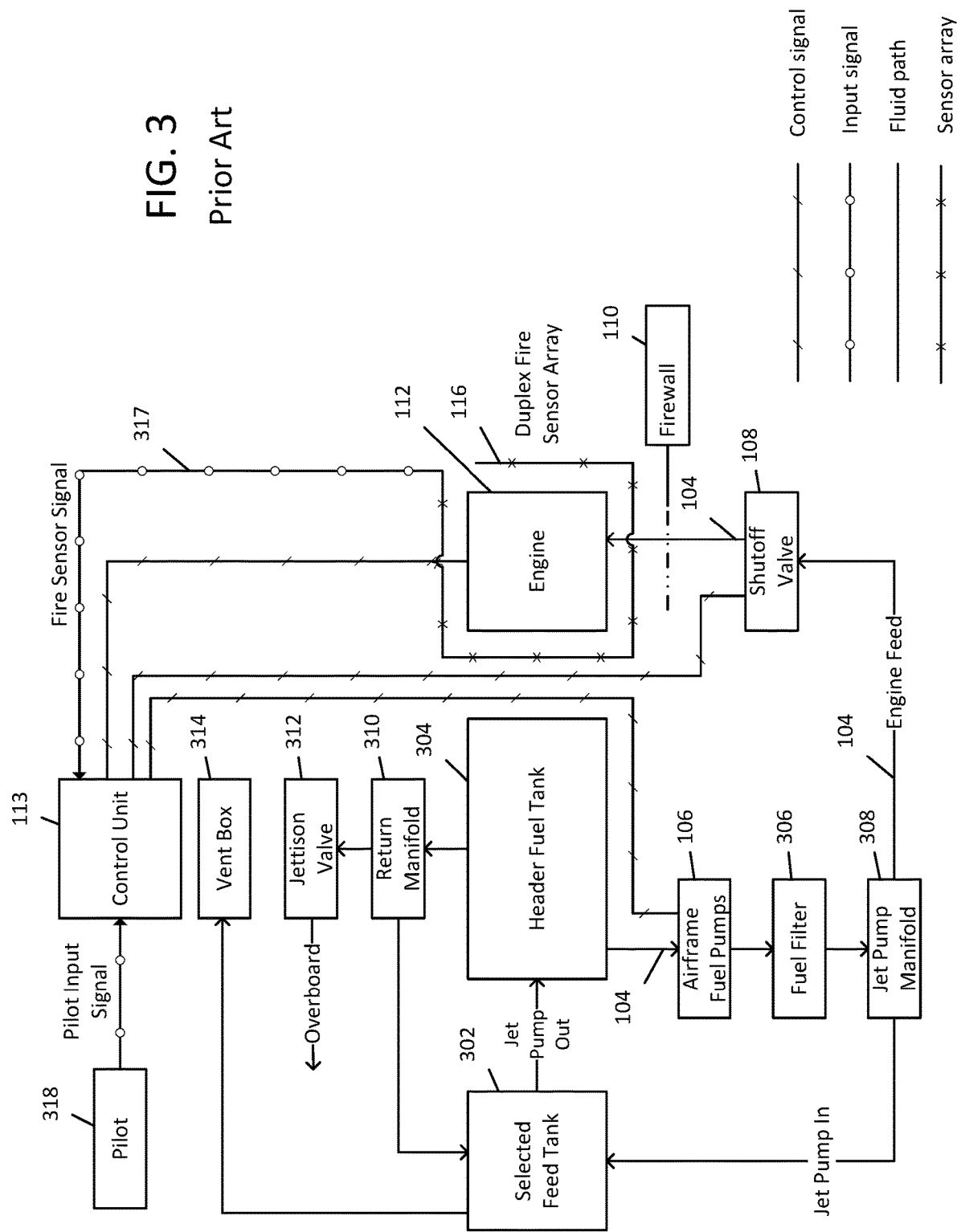
FIG. 3 comprises a functional block diagram of a conventional system for isolating fuel from the engine firebay.
Figure 4:
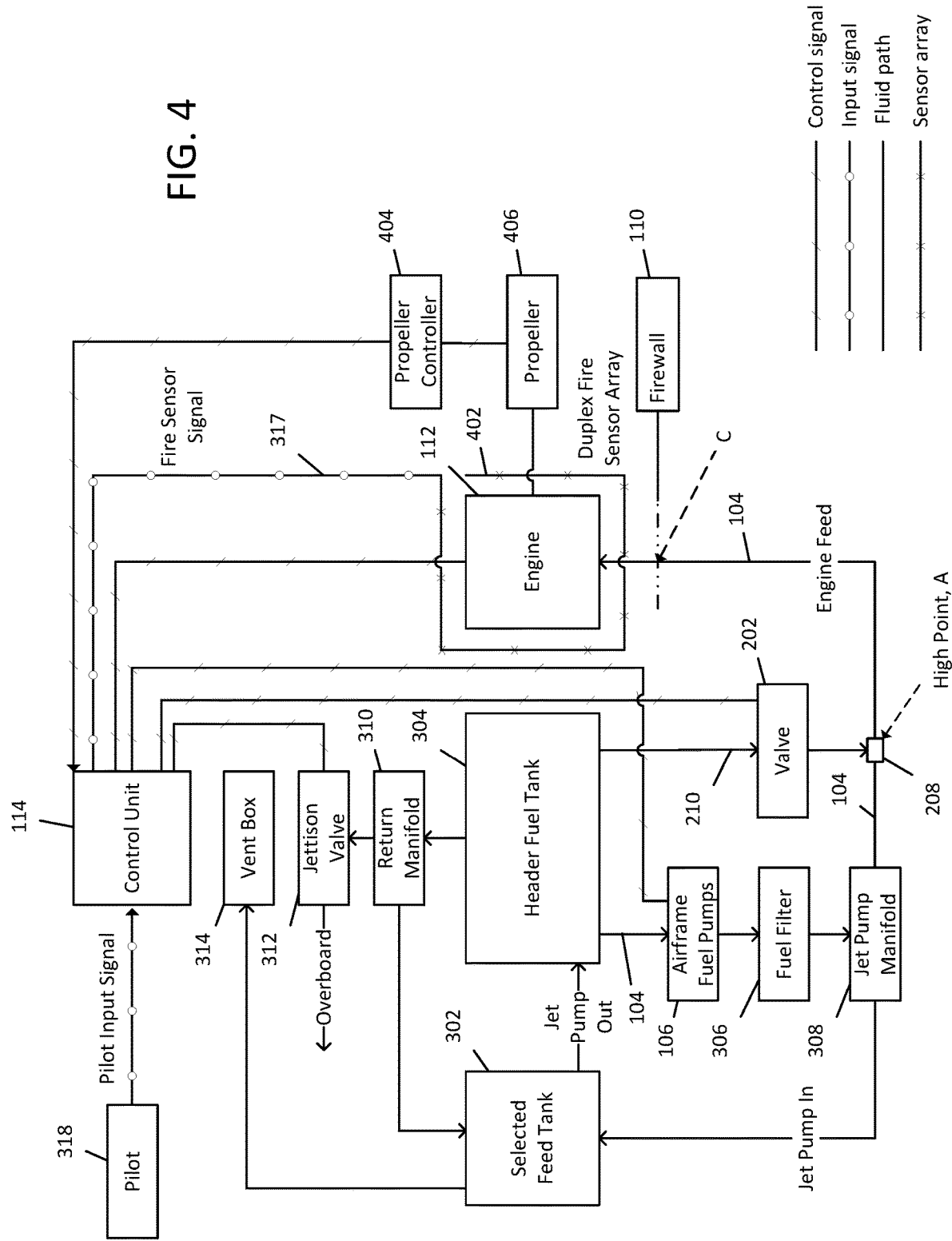
FIG. 4 comprises a functional block diagram of a system for isolating fuel from the firebay of an aircraft according to some embodiments.

Referring next to FIGS. 3 and 4, are functional block diagrams of a conventional system for isolating fuel from the engine firebay (FIG. 3), and a system for isolating fuel from the firebay of an aircraft according to some embodiments (FIG. 4), respectively. The diagrams of FIGS. 3 and 4 provide additional details relative to the diagrams of FIGS. 1 and 2.

In a conventional aircraft, the fuel tank system can include multiple feed tanks 302 and a header fuel tank 304. For example, feed tanks 302 may be located in the aircraft wings that store and feed fuel to the header fuel tank 304. Feed tanks 302 may be selected to supply fuel to the header fuel tank 304. The header fuel tank 304 is fluidly coupled to the airframe fuel pumps 106 which are connected to the fuel filter 306 and a jet pump manifold 308. The jet pump manifold 308 directs fuel to the selected feed tank 302 and the fuel feed line 104. As described above, the fuel feed line 104 passes through the shut off valve 108 and the firewall 110 to the engine 112. A return manifold 310 is fluidly coupled to the header fuel tank 304 and directs excess fuel back to the feed tank/s 302 and to a jettison valve 312. The jettison valve 312 can be opened to jettison fuel from the header fuel tank 304. A vent box 314 is fluidly coupled to the selected feed tank/s 302 to allow air from the environment in to replace fuel that is consumed. Fuel cannot exit the vent box 314. It is noted that when referring to two components being fluidly coupled or connected, it is understood that the appropriate conduit, hose or pipe structure/s and connector/s are provided to connect the two components such that fluid (air and/or liquid as appropriate) can flow between the components. There may be one or more conduit, hose or pipe structures and one or more connectors and/or couplers coupling the structures and connecting to the elements.

In FIG. 3, the control unit 113 is at least electrically coupled to and controls the fuel pumps 106, the engine 112, the jettison valve 312, and the shut off valve 108. As illustrated, the sensors 116 are implemented as a sensor array (e.g., duplex fire sensor array) that extends about the engine 112. In the event the sensors 116 detects conditions indicating an engine fire, the sensors 116 output an electrical fire sensor signal 317 to the control unit 113. In some systems, the pilot 318 is informed of the sensor condition and allowed to determine if the event is an engine fire. That is, it is possible that the sensor array will detect an engine fire condition, but there is not actually an engine fire. It is the decision of the pilot 318 to initiate fuel isolation, and this initiation signal is sent to the control unit 113. When fuel isolation is initiated, the control unit 113 outputs the electrical signal to the shut off valve 108 causing it to close and eliminating fuel flowing through the firewall.

Referring to FIG. 4, similar to that shown in FIG. 2, in some embodiments, the shut off valve in the fuel feed line at or upstream of the firewall 110 is not included and the mechanism such as described in connection with FIG. 2 is used. In these embodiments, the valve 202 fluidly couples the air line 210 from the ullage portion of the header fuel tank 304 to the connector 208 at an elevation at or above an elevation corresponding to a low elevation level of the ullage portion. In some embodiments, the connector 208 is located at the high elevation point in the fuel feed line 104. In some embodiments, the sensor array 402 is implemented as rope style sensor that is string around the firebay. The rope line includes an internal tube filled with a gas that expands when exposed to heat. When there is an engine fire condition, the gas expands and closes a pressure switch, which provides or outputs the sensor signal 317 to the control unit 114, the control unit 114 receiving the sensor signal 317. In some embodiments, there are multiple, redundant rope style sensor arrays 402 strung about different portions of the firebay. This can allow multiple sensor readings, and the pilot 318 or control unit 114 can use these signals and compare them in determining whether to initiate fuel isolation. When the sensors 402 detect a condition indicative of an engine fire, the signal 317 is sent to the control unit 114. Once fuel isolation is instructed by the pilot 318, the control unit 114 outputs the signals to turn off the engine 112, turn off the airframe fuel pumps 106 and open the valve 202. It is noted that in some embodiments, the fuel pump 106 is a positive displacement pump with an internal bypass. As described above, this cause air from the ullage portion of the header fuel tank 310 to flow through the air line 210 and be introduced into the fuel feed line 104 at the connector 208. No fuel is being pumped by the fuel pumps 106 and the air introduced into the fuel feed line 104 provides a siphon break such that fuel cannot be siphoned by the engine 112, by ruptured lines in the firebay, or siphoned by any other action. The only fuel that can flow past the firewall 110 is the remaining fuel in the line 104 from the connector 208 (point A) to the firewall 110 (point C). It is noted that the control unit 114 includes the control circuitry to control and operate the system, one or more memories and one or more interface devices. The control circuitry can include one or more processors. Control code resides in the control unit and is executed by the control circuitry to control the fuel system.

In some embodiments, the jettison valve 312 may also be briefly opened and closed to ensure adequate ullage and/or to reduce pressure in the fuel system. That is, the control unit 114 can also output a signal to the jettison valve 312 to cause it to open. In some embodiments, the jettison valve 312 is an electrically controlled, latching solenoid activated valve. The operation of the jettison valve 312 is not for the traditional purpose of the jettison valve to dump a volume of fuel, e.g., to reduce weight. The jettison valve 312 is blipped, i.e., opened for a short duration, then closed. The duration that the jettison valve 312 is held open may be dependent on the characteristics of the specific system but in some embodiments, may be between about 5 and 30 seconds, between about 10 and 20 seconds. In some embodiments, the jettison valve 312 is opened for about 15 seconds. The use of the jettison valve 312 is optional in some embodiments. That is, some fuel systems may not need to open the jettison valve 312.

In some embodiments, when initiating fuel isolation, the control unit 114 also outputs a control signal to the propeller controller 404 to output signaling to the propeller/s 406 to feather the propeller/s 406. Feathering the propellers 406 provides the lowest drag and gives the aircraft the best glide performance given that there is an engine fire event and that the engine 112 is being shut down.

In some embodiments, as described above, the fuel isolation process is initiated by the pilot 318 based on being informed that the sensors 402 have detected a condition indicative of an engine fire. In some embodiments, the pilot 318 is an onboard pilot in the aircraft and controlling flight of the aircraft. In some embodiments, the pilot is remote and pilots the aircraft from a ground station or other air station, such that the aircraft is an unmanned aerial vehicle. In such situations, sensor data is sent via the downlink to the remote pilot and return commands are sent to the aircraft via the uplink. Whether the pilot is onboard or remote, in some embodiments, the fuel isolation is confirmed and initiated by the pilot and the control unit 114 receives the command signal to initiate the fuel isolation.

In some embodiments, the control unit 114 is programmed with the logic and decision making functionality to receive the sensor signal 317 and based on at least this sensor signal, automatically determine that fuel isolation is needed. In such embodiments, the control unit 114 does not need any signaling from the pilot 318 and initiates the fuel isolation process. The control unit 114 may use the sensor signal 317 and other sensor values an determine an engine fire condition exists.

As can be seen in some embodiments, the use of a traditional shut off valve e.g., shut off valve 108 at or upstream of the firewall 110 is not needed to provide fuel isolation. It is noted that other shut off valves present in the system are not replaced, such as the engine shut off valve that is at the engine 112. The use of the valve 202, connector 208 and air line 210 allows for the replacement of conventional shut off valves in the fuel feed line 104.

In some embodiments, in the illustrated configuration, the fuel isolation to the firebay 118 is also reversible in the event it is determined that the event is not an actual engine fire. In such event, the control unit 114 outputs signals to turn on the fuel pump/s 106 and close the valve 202, unfeather the propeller/s, and then turn back on the engine 112. In this case, the flow of fuel will resume to the engine and normal operation will resume after the air in the fuel line passes through the engine.

In some embodiments, as described above, the fuel isolation system and method does not introduce a single point of failure in the system, as does a traditional shut off valve 108. If the valve 202 erroneously partially or fully opens due to an electrical and/or mechanical failure, only a small portion of the flowing fuel may pass through the valve 202 and reenter the fuel tank 102, and a sufficient amount of fuel to provide for safe operation of the engine 112 will continue flowing through the fuel feed line 104 through the firewall 110 to the engine 112. In accordance with some embodiments, in order for catastrophic fuel system failure, multiple system components would need to fail.

Figure 5:
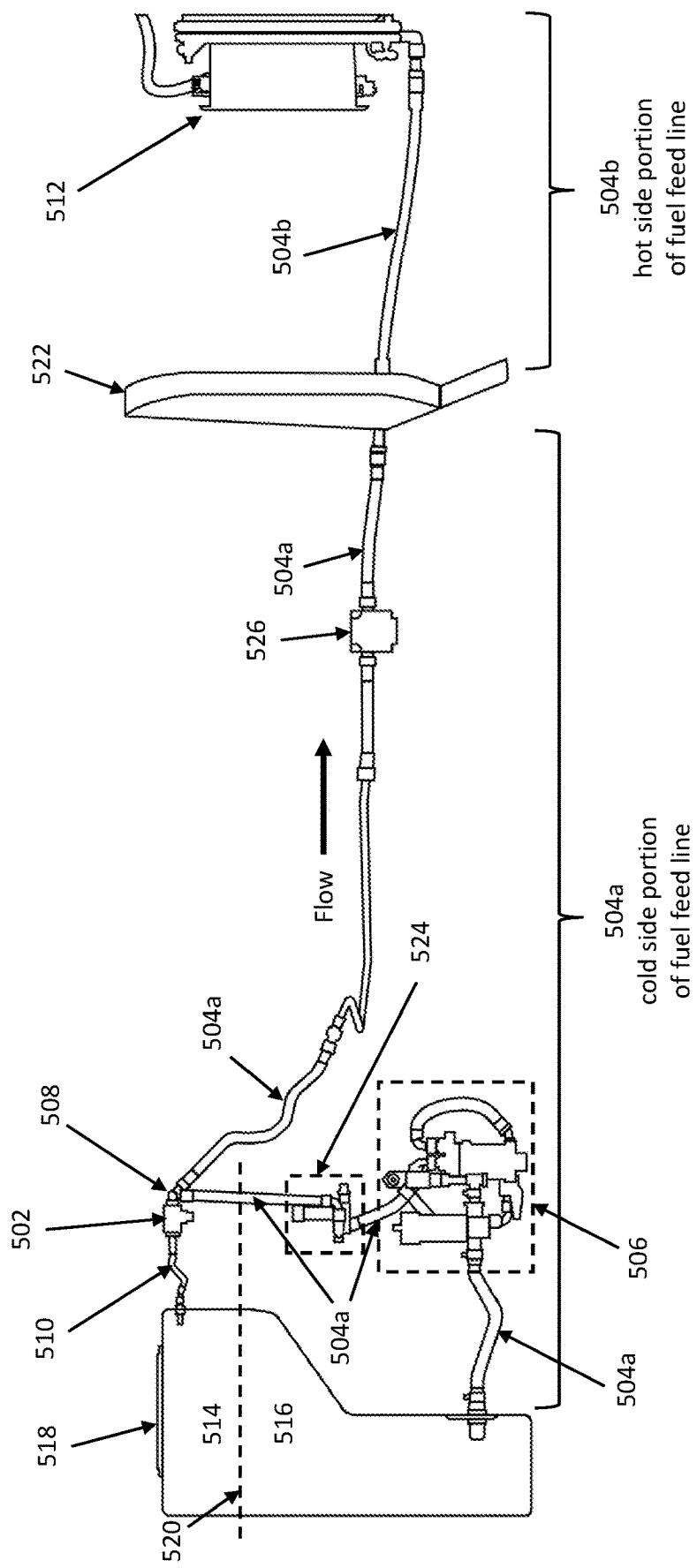
FIG. 5 comprises a diagram of a system for isolating fuel from the firebay of an aircraft according to some embodiments.

FIG. 5 comprises a diagram of a system for isolating fuel from the firebay of an aircraft according to some embodiments. This illustrated embodiment depicts a side elevation view of an example fuel system and in more detail, illustrates the various hoses, pipes, connectors and components of a fuel feed line 504. Illustrated are a header tank 518 having an ullage portion 514 and a fuel portion 516. Illustrated is an example of the various piping, hose and conduit structures that form the fuel feed line 504 that extends from the header tank 518 through the firewall 522 to the engine 512. For example, on a cold side portion 504a of the fuel feed line, fluid pipe structure connects the header tank 518 to the fuel pump assembly 506 (positive displacement with internal bypass) which includes several components such as heat exchangers, fuel filters, etc. The fuel pump assembly 506 is fluidly connected via a hose to the jet pump manifold 524 which connects to feed tanks (not shown) and to the connector 508 at a high elevation point corresponding to the ullage portion 514. As illustrated, the connector 508 is at the highest point in the fuel feed line 504a, but it is understood that the connector may be coupled to the fuel feed line at an elevation point at or above the low elevation level of the ullage portion 514, the low elevation level indicated at line 520. The hose/pipe/connector structure continues at a generally descending elevation through a flow meter 526, the firewall 522 and to the engine 512. The elevational arrangement of the header tank 518 feeding the fuel pump assembly 506 at a low elevation then raising to high point (at connector 508 for example), and then descending to a lower elevation through the flow meter 526, the firewall 522 and the engine 512 is intentional and assists in creating siphon action to assist the fuel pump assembly 506 in moving fuel through the fuel feed line 504. The hot side portion 504*b* of the fuel feed line is the portion in the firebay. The connector 508 is also fluidly connected to the valve 502 which couples the air line 510 back to the ullage portion 514 of the header tank 518.

Operation of the system of FIG. 5 is similar to the embodiments described in connection with FIGS. 2 and 4. For example, in some embodiments, when fuel isolation is initiated in response to detection of an engine fire condition, the control unit (not shown in FIG. 5) outputs electrical signals to shut down the engine 512, to turn off the fuel pump assembly 506 and to open the valve 502. This introduces air from the ullage portion 514 (which in some embodiments, is under pressure) into the fuel feed line 504*a* at the connector 508. The air causes a siphon break such that fuel cannot be siphoned past the firewall 522 and since the fuel pumps are off, fuel is no longer being pumped. Thus, in some embodiments, the only fuel capable of passing the firewall 522 is the fuel that was present in the fuel feed line 504 from the connector 508 to the firewall 522. As described in some embodiments, the control unit may also briefly open the jettison valve (not shown in FIG. 5) to reduce pressure in the fuel system. And in some embodiments, as described above, the fuel isolation technique is reversible since the valve 502 can be closed and the engine 512 and fuel pump assembly 506 can be turned back on in the event the detected engine fire is not an actual engine fire. And, in some embodiments, as described above, the fuel isolation system and method does not introduce a single point of failure in the system. That is, if the valve 502 were to mechanically and/or electrically fail and open during normal operation in which there is not an engine fire, a sufficient amount of fuel will flow through the feed line 504*a* to allow for safe operation of the engine, and only a small amount of fuel may flow back through the valve and reenter the header tank 518. It is noted that in some embodiments, the air from the ullage portion 514 is under pressure relative to atmospheric pressure. In other embodiments, the air in the ullage portion 514 is not under pressure such that the fuel tank is open to atmospheric pressure, e.g., when the fuel tank is not full or when the jettison system is activated. Whether the air from the ullage portion 514 is pressurized or not, the opening of the valve 502 introduces air from the ullage portion 514 into the fuel feed line 504*a* at the connector 508.

Figure 6:
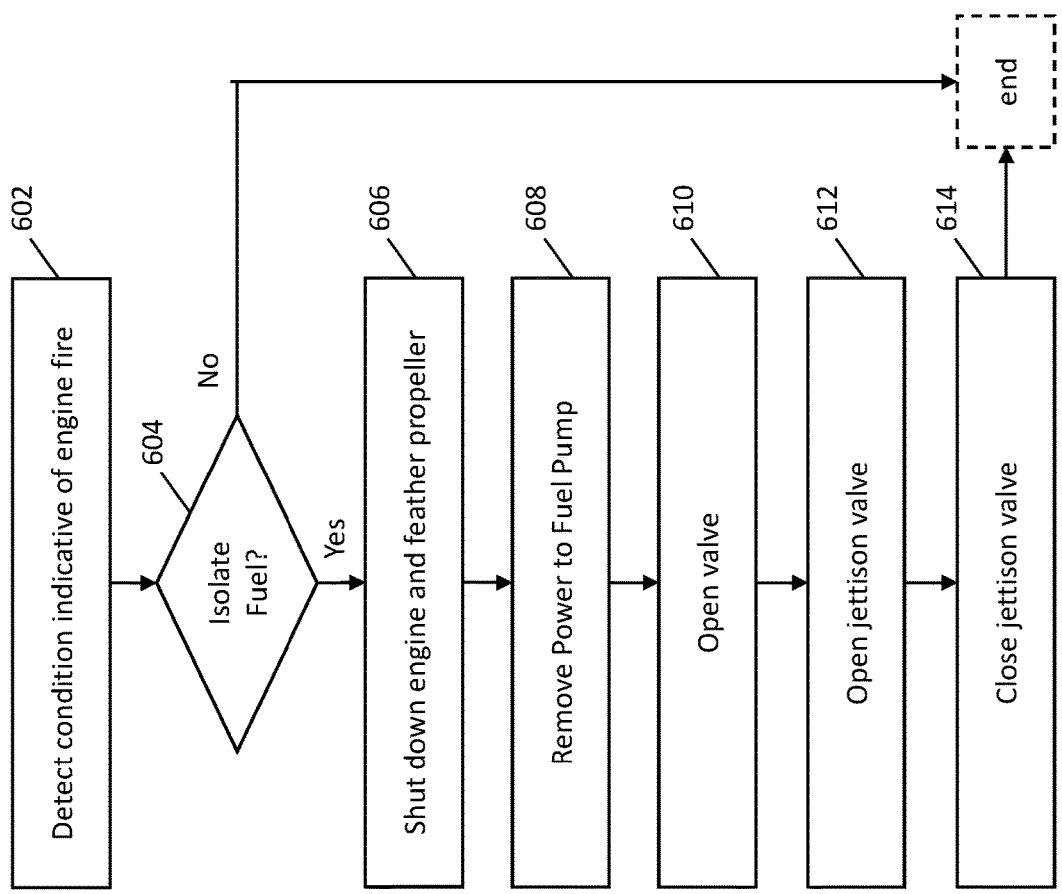
FIG. 6 comprises a flow diagram illustrating a process for isolating fuel from the firebay of an aircraft according to some embodiments.

Referring next to FIG. 6, a flow diagram is shown that illustrates a process for isolating fuel from the firebay of an aircraft according to some embodiments. The process of FIG. 6 may be performed by one or more of the various systems described herein (such as those described in connection with FIGS. 2, 4 and 5) and other systems.

A first step is to detect a condition indicative of an engine fire (Step 602). In some embodiments, sensors are positioned proximate to the engine in the firebay to detect excessive heat that indicates a possible engine fire. In some embodiments, a redundant sensor array is provided that includes a gas that expands to break a pressure switch and an electrical signal is output to the control unit of the fuel system.

Next, it is determined if fuel isolation is to be initiated (Step 604). As described herein, receipt of a signal from the sensors does not always mean that there is an actual engine fire. In some embodiments, the control unit transmits a message to the pilot (onboard or remote). The pilot evaluates the warning in view of any other sensed values and facts and determines whether to initiate fuel isolation. When the pilot intends to initiate fuel isolation, the pilot outputs a command to the control unit to initiate the fuel isolation. In other embodiments, the decision to initiate fuel isolation is made by the control unit. In such embodiments, the control unit is programmed with the logic and decision making functionality to evaluate the engine fire sensor signal and other sensor values and factors to automatically determine that fuel isolation is to be initiated. In some embodiments, it is important that a pilot be able to evaluate the facts and make a final determination as to whether to isolate fuel from the engine. This can be especially important in single engine aircraft since isolation will result in complete loss of propulsion. However, as has been described herein, fuel isolation techniques of several embodiments are easily reversible to return to normal flying operation. In such cases, since the risk of catastrophic results associated with isolating fuel in the event of detected engine fire when there is not an actual engine fire are lower due to the reversibility of the fuel isolation approach of some embodiments, system designers may be more willing to rely on an automated decision by the control unit to initiate fuel isolation. If the decision is to not isolate fuel in Step 604, then the process terminates. Whether the pilot or control unit determines that fuel isolation is needed, the control unit takes action and outputs control signals to sequence the isolation.

In some embodiments, the control unit is programmed to automatically determine that fuel isolation is to be initiated. In some cases, this may occur, for example, when a remote piloted aircraft is temporarily flying 'lost link' (i.e., out of communication with the remote pilot). In some cases, the control unit receives signal/s from sensor/s indicating a possible engine fire. Signals from redundant sensor/s assist the control unit in determining whether the sensed engine fire condition should result in fuel isolation. In some embodiments, the engine firebay is fireproof/resistant and can accommodate sustained fire for a period of time (e.g., 5 minutes). Thus, in some embodiments, the control unit delays the determination within the period of time to allow time for a remote pilot to reconnect to the aerial vehicle. In some embodiments, if the remote pilot does not reconnect within a time threshold, the control unit makes the determination that fuel isolation is to occur. In such situations, the control unit can make additional automatic determinations, such as finding and executing a suitable glide path based on the flight plan.

When the decision is to isolate fuel from the firebay (Step 604), in some embodiments, the control unit outputs signals to shut down the engine and feather one or more of the propellers (Step 606). In some embodiments, to shut down the engine, the control unit sends a signal to close the engine fuel shut off valve. Feathering the propellers provides the lowest drag and gives the aircraft the best glide performance given that the engine is being shut down.

Next, power is removed to the fuel pump/s (Step 608) in order to turn off the fuel pump/s. In some embodiments, the control unit outputs control signals to turn off the fuel pumps, and in some cases, the control signal results in power being removed from the fuel pumps. The turning off of the airframe fuel pumps stops the pumping of fuel from the fuel tank through the fuel feed line and firewall to the engine within the engine firebay.

At about the same time or slightly after Step 608 is performed, the valve is opened (Step 610). In some embodiments, the valve (e.g., valve 202, 502) is coupled to a connector (e.g., connector 208, 508) coupled inline with the fuel feed line at a location of a cold side portion of the fuel feed line (the cold side portion of the fuel feed line extends from the fuel tank to the firewall, the hot side portion of the fuel feed line extends from the firewall to the engine). In some embodiments, the valve is in a normally closed orientation. The valve also couples an air line (e.g., air line 210, 510) extending from the valve to the ullage portion of the fuel tank. In some embodiments, the connector is coupled inline with the fuel feed line at a high elevation location of the cold side of the fuel feed line, the high elevation location at or above an elevation corresponding to a low elevation level of the ullage portion of the fuel tank. And in some embodiments, the connector is coupled inline with the fuel feed line at a high elevation point location of the cold side of the fuel feed line. In some embodiments, the connector is a tee connector.

A result of opening the valve in Step 610 is that air from the ullage portion of the fuel tank is introduced via the air line and the valve into the fuel feed line to provide a siphon break in the fuel line such that the fuel cannot be siphoned by the engine, ruptured lines or other cause, and the only fuel reaching the engine is the remaining fuel in the fuel feed line downstream of the connector and the introduced air. This results in isolation of fuel from the engine firebay without the use of a traditional shut off valve at or upstream of the firewall.

Next, a jettison valve fluidly connected to the fuel tank is opened (Step 612) and then closed (Step 614) after a period of time. In some embodiments, the period of time is short and for the purpose of ensuring sufficient ullage and/or reducing pressure in the fuel system. That is, in some embodiments the jettison valve is not being opened to jettison fuel in its normal use. The jettison valve 312 is blipped, i.e., opened for a short duration, then closed. The duration may be dependent on the characteristics of the specific system but in some embodiments, may be between about 5 and 30 seconds, between about 10 and 20 seconds. In some embodiments, the jettison valve is opened for about 15 seconds.

At this point in the process, in some embodiments, fuel has been isolated from the engine firebay such that fuel is not pumped to the engine, and the air introduced creates a siphon break so that fuel cannot be siphoned from the fuel tanks to the engine. Pressure in the fuel system is relieved and the propeller/s are feathered for best glide performance. Fuel is isolated without use of a shut off valve in the fuel feed line on the cold side of the firewall avoiding a single point of failure. In the event of a mechanical and/or electrical failure of the valve when there is not an engine fire or not a command to initiate fuel isolation, due to the configuration of the piping sizes and arrangement, a sufficient level of fuel continues to flow through the fuel feed line and the connector from the fuel tank to the engine to allow for safe operation of the engine. And in this event, a small portion of the fuel is diverted through the valve back to the fuel tank via the air feed line.

Figure 7:
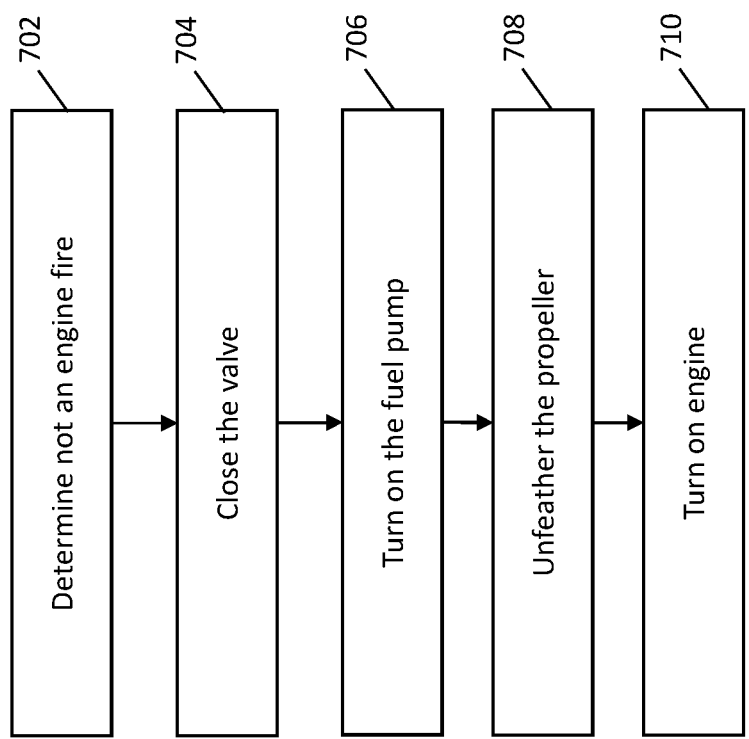
FIG. 7 comprises a flow diagram illustrating a process for restarting operation after fuel has been isolated from the aircraft firebay according to some embodiments.

Referring next to FIG. 7, a flow diagram is shown that illustrates a process for restarting engine operation after fuel has been isolated from the aircraft firebay according to some embodiments. The process of FIG. 7 may be performed by one or more of the various systems described herein (such as those described in connection with FIGS. 2, 4 and 5) and other systems. The process of FIG. 7 illustrates the reversibility of the fuel isolation techniques described herein.

Initially, it is determined that although fuel isolation was initiated, there has not been an engine fire and fuel isolation is to end (Step 702). The control unit then outputs signals to close the valve (Step 704) that is functioning as the siphon break in the fuel feed line, and outputs signals to turn on the fuel pump/s (Step 706). This brings pressure back into the fuel system. Next, signaling is output to unfeather the propeller/s (Step 708). Air movement across the propeller causes the engine to start turning. And next, the engine is turned back on (Step 710). In some embodiments, this signaling causes the engine fuel valve to open which will cause the igniters to come on and the engine will restart normally. As the engine restarts, the air in the fuel feed line will be ingested by the engine and result in a brief reduction in rpm (revolutions per minute) before returning to normal operation. It is noted that sufficient fuel still remains in the header fuel tank since the jettison valve was only operated to reduce pressure and not to jettison bulk quantities of fuel in its normal use.

Figure 8:
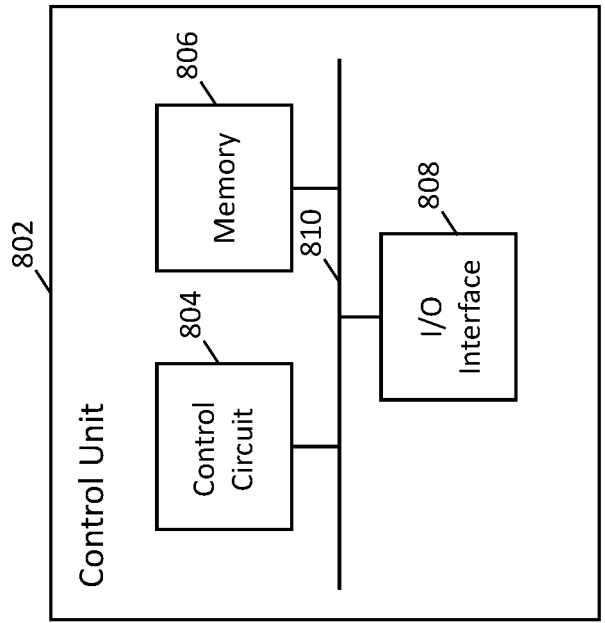
FIG. 8 comprises a functional block diagram of a control unit in accordance with some embodiments.

FIG. 8 comprises a functional block diagram of a control unit 802 in accordance with some embodiments. In some embodiments, the control unit may be referred to as the engine and fuel interface unit (EFIU). The control unit 802 may be used as any of the control units described herein, such as control unit 114. The control unit 802 can be implemented through one or more processors, microprocessors, central processing unit, logic, local digital storage, firmware and/or other control hardware and/or software, and may be used to execute or assist in executing the steps of the processes, methods and techniques described herein. In some embodiments, the control module or control unit 802 includes a control circuit 804, one or more memories 806, one or more Input/Output (IO) interfaces 808 and a bus 810 interconnecting these components.

In some embodiments, the one or more memories 806 comprises non-transitory computer-readable storage mediums storing a set of computer readable instructions. Such memories may comprise volatile and/or non-volatile memory such as such as RAM, ROM, EEPROM, flash memory and/or other memory technology, and have stored upon it a set of computer readable instructions which, when executed by the control circuit 804, causes the control circuit 804 to provide at least the various functions described herein.

In some embodiments, the control circuit 804 is a processor-based system including one or more processors. The control circuit 804 and at least one of the one or more memories 806 may be integrated together, such as in a microcontroller, application specification integrated circuit, field programmable gate array or other such device, or may be separate devices coupled together. Generally, the control circuit 804 can comprise a fixed-purpose hard-wired platform or can comprise a partially or wholly programmable platform. These architectural options are well known and understood in the art and require no further description here. And generally, the control circuit 804 is configured (for example, by using corresponding programming as will be well understood by those skilled in the art) to carry out one or more of the steps, actions, and/or functions described herein.

Typically, the control unit 802 also includes one or more IO interfaces 808 such as, ports, connectors, pins, transceivers and the like allowing the control unit 802 to interface with other circuitry of the aircraft, power supplies and components, communication devices to communicate with other onboard and/or remote systems, other aircraft systems and control units, sensors, and so on, and sensors. Communication devices can be configured for wired, wireless, optical, fiber optical cable or other such communication configurations or combinations of such communications.

Several embodiments describe fuel isolation systems, apparatuses and methods for use in manned and/or unmanned aerial vehicles (aircraft). In alternative embodiments, the fuel isolation approaches are applicable in the same manner in other than aerial vehicles, such as watercraft (e.g., surface boat or submarine vehicles) and ground vehicles (e.g., automobiles, trucks). For example, the described approaches and components are applicable in vehicles generally, whether aerial, terrestrial, surface watercraft and submarine watercraft. In some embodiments, the applicability of fuel isolation may be attractive to a fuel system designer for vehicles in which loss of life and damage is imminent when fuel is not shut off to the engine or when living occupants of the vehicle are not able to easily exit the vehicle in the event of an engine fire. It is understood that any of the terms used herein that are specific to aircraft may be more generically named to apply to one or more these other types of vehicles. For example, airframe fuel pumps may be more generically expressed as fuel pumps or more specifically expressed as a watercraft fuel pumps, an aircraft engine firebay can be more generically expressed as a vehicle engine firebay or may be more specifically expressed as a watercraft engine firebay, and so on.

Some embodiments are applicable in single engine and multiple engine vehicles. That is, embodiments of the fuel isolation systems can be applied to single engine vehicles, such as aircraft. In some cases, these approaches are beneficial in single engine vehicles since at least: (1) it may be important to reliably shut off fuel to the single engine in the event of an engine fire condition; (2) fuel isolation is reversible if determined not to be an engine fire; and (3) if the valve (e.g., valve 202, 502) fails, fuel will still flow to the engine allowing for safe operation. In some embodiments using multiple engines, the use of the valve, connector and air line is replicated (paralleled) at the fuel feed line of each engine and controlled by the control unit. If a given engine experiences an engine fire condition, the valve is opened for that engine and not for the others. As such, each engine can have an independent fuel isolation components controlled by a control unit. In some embodiments using multiple engines, there is a single connection point to the ullage of the header tank, the single connection point coupled to a manifold to variously connect to multiple air lines extending to the valves/connectors of each fuel feed line of each separate engine.

It is further noted that in some embodiments, safe operation of the fuel isolation systems, apparatuses and methods is based on breaking the siphon action in the fuel feed line. Since air is introduced into the line from the ullage of the header tank, in the context of an aerial vehicle, such technique will not operate effectively if the aircraft were an acrobatic aircraft flying inverted or at steep angles. In such cases, there may not be an ullage at the connection point to the header tank. However, several embodiments are arranged to be effective given normal upright aviation (vehicular travel) and normal ascent/descent angles. Such fuel isolation techniques are applicable in various types of general aviation aircraft, such as cargo aircraft, small commuter aircraft, multi-purpose reconnaissance vehicles, and so on.

Several embodiments of fuel isolation systems, apparatuses and methods are described herein. In some embodiments, a system and method for use in isolating fuel from an aircraft firebay, the system comprising: a fuel tank; an airframe fuel pump; an engine located within the aircraft firebay; a firewall separating the aircraft firebay from a volume containing the fuel tank and the airframe fuel pump; a fuel feed line extending from the fuel tank to the airframe fuel pump and through the firewall to the engine, the fuel feed line fluidly connecting the fuel tank to the engine and additional aircraft systems, wherein the airframe fuel pump is configured to pump fuel from the fuel tank through the fuel feed line to the engine, wherein the fuel feed line comprises a cold side portion extending from the fuel tank to the firewall and a hot side portion extending from the firewall to the engine; a connector coupled inline with the fuel feed line at a location of the cold side portion of the fuel feed line; a valve coupled to the connector, the valve configured in a normally closed orientation; an air feed line coupled to an ullage portion of the fuel tank and to the valve; and a control unit configured to control operation of at least the airframe fuel pump and the valve. In the event of an engine fire, the control unit is configured to output control signaling to: turn off the airframe fuel pump to stop pumping the fuel through the fuel feed line; and open the valve to introduce air from the ullage portion of the fuel tank into the fuel feed line, wherein the air introduced by the valve provides a siphon break in the fuel line such that the fuel cannot be siphoned and the only fuel that can pass the firewall is the remaining fuel in the fuel feed line downstream of the connector and the introduced air.

In some embodiments, a method for isolating fuel from an aircraft firebay, the method comprises: in the event of an engine fire, turning off an airframe fuel pump to stop pumping the fuel through a fuel feed line fluidly connecting a fuel tank to an engine within the aircraft firebay and passing through a firewall that separates the aircraft firebay from a volume containing the airframe fuel pump and the fuel tank; opening a valve coupled to a connector coupled inline with the fuel feed line at a location of a cold side portion of the fuel feed line, wherein the cold side portion of the fuel feed line extends from the fuel tank to the firewall, and wherein a hot side portion of the fuel feed line extends from the firewall to the engine, wherein the valve is in a normally closed orientation; and introducing, by opening the valve, air from an ullage portion of the fuel tank into the fuel feed line to provide a siphon break in the fuel line such that the fuel cannot be siphoned and the only fuel reaching the engine is the remaining fuel in the fuel feed line downstream of the connector and the introduced air, the air received from an air feed line coupled to the ullage portion of the fuel tank and to the valve.

In some embodiments, an apparatus for isolating fuel from an aircraft firebay comprises: a non-transitory storage medium storing a set of computer readable instructions; and a control unit comprising a control circuit configured to execute the set of computer readable instructions which causes to the control unit to: output, in the event of an engine fire, control signaling to turn off an airframe fuel pump to stop pumping the fuel through a fuel feed line fluidly connecting a fuel tank to an engine within the aircraft firebay and passing through a firewall that separates the aircraft firebay from a volume containing the airframe fuel pump and the fuel tank; and output, in the event of the engine fire, control signaling to open a valve coupled to a connector coupled in line with the fuel feed line at a location of a cold side portion of the fuel feed line, wherein the cold side portion of the fuel feed line extends from the fuel tank to the firewall, and wherein a hot side portion of the fuel feed line extends from the firewall to the engine, wherein the valve is in a normally closed orientation, wherein air from an ullage portion of the fuel tank is introduced into the fuel feed line to provide a siphon break in the fuel line such that the fuel cannot be siphoned and the only fuel passing the firewall is the remaining fuel in the fuel feed line downstream of the connector and the introduced air, the air received from an air feed line coupled to the ullage portion of the fuel tank and to the valve.

In some embodiments, system for use in isolating fuel from a vehicle firebay comprises: a fuel tank; a fuel pump; an engine located within the vehicle firebay; a firewall separating the vehicle firebay from a volume containing the fuel tank and the fuel pump; a fuel feed line extending from the fuel tank to the airframe fuel pump and through the firewall to the engine, the fuel feed line fluidly connecting the fuel tank to the engine and additional systems, wherein the fuel pump is configured to pump fuel from the fuel tank through the fuel feed line to the engine, wherein the fuel feed line comprises a cold side portion extending from the fuel tank to the firewall and a hot side portion extending from the firewall to the engine; a connector coupled inline with the fuel feed line at a location of the cold side portion of the fuel feed line; a valve coupled to the connector, the valve configured in a normally closed orientation; an air feed line coupled to an ullage portion of the fuel tank and to the valve; and a control unit configured to control operation of at least the fuel pump and the valve, wherein in the event of an engine fire, the control unit is configured to output control signaling to: turn off the fuel pump to stop pumping the fuel through the fuel feed line; and open the valve to introduce air from the ullage portion of the fuel tank into the fuel feed line, wherein the air introduced by the valve provides a siphon break in the fuel line such that the fuel cannot be siphoned and the only fuel that can pass the firewall is the remaining fuel in the fuel feed line downstream of the connector and the introduced air.

It is noted that in some embodiments, air that is introduced into the fuel feed line 104, 504*a* via the valve 202, 502 at connector 208, 508 may be more generically provided by an air source. In some embodiments, the air source is the ullage portion 204, 514 of the fuel tank 102, 304, 518 as described herein. In some embodiments, the air source is a separate volume containing air that is coupled to the air line 210. For example, in some embodiments, instead of the air line 210 connecting the ullage portion 204 of the fuel tank 102 to the valve 202 in FIG. 2, a separate air source (not shown) would be connected by the air line 210 to the valve 202. In some embodiments, the air source maintains the air under pressure, and in other embodiments, the air source is at atmospheric pressure. In some forms, the air source is a vent box coupled to the air line 210. In some embodiments, in the event of failure of the valve 202, 502 such that it is at least partially open when there is not an engine fire, the fuel continues to flow at a sufficient level through the fuel feed line 104, 504*a* and the connector 208, 508 from the fuel tank 102, 304, 518 to the engine to allow for safe operation of the engine. And, in some embodiments, in the event of the failure of the valve 202, 502 such that it is at least partially open when there is not an engine fire, a portion of the fuel flowing through the fuel feed line is diverted through the valve 202, 502 to the volume of the air source via the feed line 210. In some embodiments, the fuel returned into the volume of the air source is one or more of: collected in the volume of the air source; dumped/jettisoned from the volume of the air source to the environment; and returned from the volume of the air source to the fuel tank 102, 304. It is understood that known valves, vents, pipes, hoses, connectors and the like can be used to appropriately route the returned fuel. It is further noted that in some embodiments, the connector 208, 508 is coupled inline with the fuel feed line 104, 504*a* at a high elevation location of the cold side of the fuel feed line, the high elevation location at or above an elevation corresponding to a low elevation point of the air source of the fuel tank 102, 304. For example, similar to that shown in FIG. 2, the connector 208 is coupled to the fuel feed line 104 at or above a low elevation of the point of the air source, which can be represented at line B.

Accordingly, in some embodiments, a system and method for use in isolating fuel from an aircraft firebay, the system comprising: a fuel tank; an airframe fuel pump; an engine located within the aircraft firebay; a firewall separating the aircraft firebay from a volume containing the fuel tank and the airframe fuel pump; a fuel feed line extending from the fuel tank to the airframe fuel pump and through the firewall to the engine, the fuel feed line fluidly connecting the fuel tank to the engine and additional aircraft systems, wherein the airframe fuel pump is configured to pump fuel from the fuel tank through the fuel feed line to the engine, wherein the fuel feed line comprises a cold side portion extending from the fuel tank to the firewall and a hot side portion extending from the firewall to the engine; a connector coupled inline with the fuel feed line at a location of the cold side portion of the fuel feed line; a valve coupled to the connector, the valve configured in a normally closed orientation; an air feed line coupled to an air source and to the valve; and a control unit configured to control operation of at least the airframe fuel pump and the valve. In the event of an engine fire, the control unit is configured to output control signaling to: turn off the airframe fuel pump to stop pumping the fuel through the fuel feed line; and open the valve to introduce air from the air source into the fuel feed line, wherein the air introduced by the valve provides a siphon break in the fuel line such that the fuel cannot be siphoned and the only fuel that can pass the firewall is the remaining fuel in the fuel feed line downstream of the connector and the introduced air. In some embodiments, in the event of a failure of the valve such that it is at least partially open when there is not an engine fire, the fuel continues to flow at a sufficient level through the fuel feed line and the connector from the fuel tank to the engine to allow for safe operation of the engine. And in some embodiments, in the event of the failure of the valve such that it is at least partially open when there is not an engine fire, a portion of the fuel flowing through the fuel feed line is diverted through the valve to the air source via the air feed line. And in some embodiments, the connector is coupled inline with the fuel feed line at a high elevation location of the cold side of the fuel feed line, the high elevation location at or above an elevation corresponding to a low elevation point of the air source.

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

What is claimed is:

1. A system for use in isolating fuel from a vehicle firebay, the system comprising:
   a fuel tank;
   a fuel pump;
   an engine located within the vehicle firebay;
   a firewall separating the vehicle firebay from a volume containing the fuel tank and the fuel pump;
   a fuel feed line extending from the fuel tank to the fuel pump and through the firewall to the engine, wherein the fuel feed line comprises a cold side portion extending from the fuel tank to the firewall and a hot side portion extending from the firewall to the engine;
   a connector coupled inline with the fuel feed line at a location of the cold side portion of the fuel feed line;
   a valve coupled to the connector;
   a feed line coupled to a fluid source and to the valve; and
   a control unit configured to control operation of at least the fuel pump and the valve, wherein the control unit is configured to output control signaling to:
      turn off the fuel pump to stop pumping the fuel through the fuel feed line; and
      operate the valve to introduce a fluid from the fluid source into the fuel feed line, wherein the fluid introduced by the valve provides a siphon break in the fuel line such that the only fuel that can pass the firewall is the remaining fuel in the fuel feed line downstream of the connector and the introduced fluid.

2. The system of claim 1, wherein the fuel feed line does not include a shut off valve in the cold side portion of the fuel feed line extending from the fuel pump to the firewall.

3. The system of claim 1, wherein in the event of an engine fire, the control unit is configured to output control signaling to turn off the engine.

4. The system of claim 1, further comprising a jettison valve fluidly connected to the fuel tank, wherein in the event of the engine fire, the control unit is configured to output control signaling to operate the jettison valve for a period of time to reduce pressure in the fuel system.

5. The system of claim 1, wherein in the event of an engine fire is not an actual engine fire, the control unit is configured to output control signaling to:
   start the engine;
   turn on the fuel pump; and
   operate the valve such that the fuel will resume flowing to the engine.

6. The system of claim 1, wherein in the event of a failure of the valve when there is not an engine fire, the fuel continues to flow at a sufficient level through the fuel feed line and the connector from the fuel tank to the engine to allow for safe operation of the engine.

7. The system of claim 6, wherein in the event of the failure of the valve when there is not an engine fire, a portion of the fuel flowing through the fuel feed line is diverted through the valve to the fuel tank via the fluid feed line.

8. The system of claim 1, wherein the connector is coupled inline with the fuel feed line at a high elevation location of the cold side of the fuel feed line, the high elevation location at or above an elevation corresponding to a low elevation point of the fluid source.

9. The system of claim 1, wherein the connector is coupled inline with the fuel feed line at a high elevation point location of the cold side of the fuel feed line.

10. The system of claim 1, wherein the connector comprises a tee connector coupled inline with the fuel feed line and coupled to the valve.

11. The system of claim 1, further comprising one or more sensors proximate to the engine and configured to detect a condition indicative of an engine fire and provide sensor signaling to the control unit.

12. The system of claim 11, wherein the control unit is configured to:
   receive the sensor signaling;
   transmit a message to a vehicle operator indicate the detection of the condition indicative of the engine fire;
   receive a command from the vehicle operator to initiate fuel isolation; and
   output control signaling to turn off the fuel pump to stop pumping the fuel through the fuel feed line and to operate the valve to introduce the fluid into the fuel feed line.

13. The system of claim 11, wherein the control unit is configured to:
   receive the sensor signaling;
   based on at least the received sensor signaling, determine that fuel isolation is needed; and
   output control signaling to turn off the fuel pump to stop pumping the fuel through the fuel feed line and to operate the valve to introduce the fluid into the fuel feed line.

14. The system of claim 1, wherein the vehicle comprises one of a manned aerial vehicle, an unmanned aerial vehicle, a watercraft, and a ground vehicle.

15. The system of claim 1, wherein the vehicle comprises one of multi-engine vehicle and a single engine vehicle.

16. The system of claim 1, wherein the fluid source coupled to the fluid feed line comprises an ullage portion of the fuel tank, a separate volume containing the fluid, and/or a vent box.

17. The system of claim 1, wherein the fluid from the fluid source is maintained at a pressure or at atmospheric pressure.

18. The system of claim 1, wherein the fluid from the fluid source comprises one of air, a gas and a liquid.

19. A method for isolating fuel from a vehicle firebay, the method comprising:
   turning off a fuel pump to stop pumping the fuel through a fuel feed line passing through a firewall to an engine within the vehicle firebay, wherein firewall separates the vehicle firebay from a volume containing the fuel pump and the fuel tank;
   operating a valve coupled to a connector coupled inline with the fuel feed line at a location of a cold side portion of the fuel feed line, wherein the cold side portion of the fuel feed line extends from the fuel tank to the firewall, and wherein a hot side portion of the fuel feed line extends from the firewall to the engine; and
   introducing, by operating the valve, fluid from a fluid source into the fuel feed line to provide a siphon break in the fuel line such that the only fuel reaching the engine is the remaining fuel in the fuel feed line downstream of the connector and the introduced fluid, the fluid received from a fluid feed line coupled to the fluid source and to the valve.

20. The method of claim 19, wherein the fuel feed line does not include a shut off valve in the cold side portion of the fuel feed line extending from the fuel pump to the firewall.

21. The method of claim 19, further comprising:
   in the event of an engine fire,
      outputting, by a control unit, signaling to turn off the fuel pump and to operate the valve.

22. The method of claim 19, wherein in the event of an engine fire,
    outputting, by the control unit, control signaling to turn off the engine.

23. The method of claim 19, further comprising:
    in the event of an engine fire,
        operating a jettison valve fluidly connected to the fuel tank for a period of time to reduce pressure in the fuel system.

24. The method of claim 19, wherein in the event of an engine fire is not an actual engine fire, the method comprises:
    outputting, by the control unit, control signaling to start the engine, to turn on the fuel pump and to operate the valve such that the fuel will resume flowing to the engine.

25. The method of claim 19,
    wherein in the event of a failure of the valve when there is not an engine fire,
    flowing fuel at a sufficient level through the fuel feed line and the connector from the fuel tank to the engine to allow for safe operation of the engine.

26. The method of claim 25,
    wherein in the event of the failure of the valve when there is not an engine fire,
    diverting a portion of the fuel flowing through the fuel feed line through the valve back to the fuel tank via the fluid feed line.

27. The method of claim 19, wherein the connector is coupled inline with the fuel feed line at a high elevation location of the cold side of the fuel feed line, the high elevation location at an elevation corresponding to a low elevation point of the fluid source.

28. The method of claim 19, wherein the connector is coupled inline with the fuel feed line at a high elevation point location of the cold side of the fuel feed line.

29. The method of claim 19, wherein the connector comprises a tee connector coupled inline with the fuel feed line and coupled to the valve.

30. The method of claim 19, further comprising:
    detecting, by one or more sensors proximate to the engine, a condition indicative of an engine fire; and
    providing sensor signaling to the control unit.

31. The method of claim 30, further comprising:
    receiving, at the control unit, the sensor signaling;
    transmitting a message to a vehicle operator to indicate the detection of the condition indicative of the engine fire;
    receiving a command from the vehicle operator to initiate fuel isolation; and
    outputting control signaling to initiate the steps of turning off the fuel pump, operating the valve, and introducing the fluid.

32. The method of claim 30, further comprising:
    receiving, at the control unit, the sensor signaling;
    determining, based on at least the received sensor signaling, that fuel isolation is needed; and
    outputting control signaling to initiate the steps of turning off the fuel pump, operating the valve, and introducing the fluid.

33. The method of claim 19, wherein the vehicle comprises one of a manned aerial vehicle, an unmanned aerial vehicle, a watercraft, and a ground vehicle.

34. The method of claim 19, wherein the vehicle comprises one of a multi-engine vehicle and a single engine vehicle.

35. The method of claim 19, wherein the fluid source coupled to the fluid feed line comprises an ullage portion of the fuel tank, a separate volume containing fluid, and/or a vent box.

36. The method of claim 19, wherein the fluid from the fluid source is maintained at a pressure or at atmospheric pressure.

37. The method of claim 19, wherein the fluid from the fluid source comprises one of air, a gas and a liquid.

38. An apparatus for isolating fuel from a vehicle firebay, the apparatus comprising:
    a non-transitory storage medium storing a set of computer readable instructions; and
    a control unit comprising a control circuit configured to execute the set of computer readable instructions which causes to the control unit to:
        output control signaling to turn off a fuel pump to stop pumping the fuel through a fuel feed line from a fuel tank to an engine within the vehicle firebay and passing through a firewall that separates the vehicle firebay from a volume containing the fuel pump and the fuel tank; and
        output control signaling to operate a valve coupled to a connector coupled in line with the fuel feed line at a location of a cold side portion of the fuel feed line, wherein the cold side portion of the fuel feed line extends from the fuel tank to the firewall, and wherein a hot side portion of the fuel feed line extends from the firewall to the engine, wherein fluid from a fluid source is introduced into the fuel feed line to provide a siphon break in the fuel line such that the only fuel passing the firewall is the remaining fuel in the fuel feed line downstream of the connector and the introduced fluid, the fluid received from a fluid feed line coupled to the fluid source and to the valve.

39. The apparatus of claim 38, wherein the vehicle comprises one of a manned aerial vehicle, an unmanned aerial vehicle, a watercraft, and a ground vehicle.

40. The apparatus of claim 38, wherein the fluid from the fluid source comprises one of air, a gas and a liquid.

* * * * *